United States Patent [19]

Hakamada et al.

[11] Patent Number: 4,870,492
[45] Date of Patent: Sep. 26, 1989

[54] TELEVISION RECEIVER HAVING AUTOMATICALLY PROGRAMMABLE SKIP CHANNEL LIST

[75] Inventors: Kunio Hakamada; Hirofumi Usui, both of Tokyo, Japan

[73] Assignee: Sony Corporation, Tokyo, Japan

[21] Appl. No.: 76,015

[22] Filed: Jul. 21, 1987

[30] Foreign Application Priority Data

Jul. 31, 1986 [JP] Japan ................................. 61-180417

[51] Int. Cl.⁴ .......................... H04N 5/50; H04B 1/18
[52] U.S. Cl. .............................. 358/193.1; 358/194.1; 455/166; 455/186
[58] Field of Search ............... 358/191.1, 193.1, 194.1; 455/166, 185, 186, 151, 352, 353

[56] References Cited

U.S. PATENT DOCUMENTS 4,495,654  1/1985  Deiss ................................. 358/194.1
4,524,866  6/1985  Templin ............................. 455/166

FOREIGN PATENT DOCUMENTS 14101  2/1979  Japan ................................. 455/166

Primary Examiner—Tommy P. Chin
Attorney, Agent, or Firm—Philip M. Shaw, Jr.

[57] ABSTRACT

In a television receiver having a channel skip function capable of skipping a channel on the basis of skip flag data stored in a memory, when an automatic add key is depressed, skip flag data of a channel through which a television signal is received is automatically set to a predetermined value so as to enable the user to operate the television receiver more conveniently.

6 Claims, 2 Drawing Sheets

| Channel | Skip Flag Data |
|---|---|
| 1 | 1 |
| 2 | 0 |
| 3 | 1 |
| 4 | 1 |
| ⋮ | ⋮ |
| N | 1 |

TELEVISION RECEIVER HAVING AUTOMATICALLY PROGRAMMABLE SKIP CHANNEL LIST

BACKGROUND OF THE INVENTION

1. Field of the Invention

This invention relates generally to television receivers and more particularly to a television receiver having a channel skip function.

2. Description of the Prior Art

There is known a television receiver having a channel skip function. This channel skip function will be described. As, for example, shown in FIG. 1, N skip flag data (SFLG) are stored in a skip memory of a television receiver. When a user presses an up-key or a down-key for the channel, the channel is scanned sequentially in the up or down direction. At the same time, if SFLG="0", the corresponding channel is skipped. If on the other hand SFLG="1", the channel skip operation is not carried out at the corresponding channel.

In this case, the user can freely set the skip and stop of the channel, or the user can freely set the skip flag data to "0" or "1". The user can select a desired channel by using ten keys and then set the skip flag data SFLG corresponding to the channel selected to "1" or "0" by pressing an add key or an erase key.

A total of 125 channels of standard television broadcast and CATV broadcast through radio waves are available, for example, in the U.S.A. In practice, of the 125 channels only about 60 channels, depending on different localities, are used for television broadcasting. Upon shipment from the factories, however, only about 2 to 13 channels for standard television broadcasts are preset in the television receiver.

Accordingly, when the user has purchased a television receiver having the channel skip function, the user has to set the channel skip flag data SFLG to "1" with respect to all of the remaining desired channels except for the preset 2 to 13 channels of the 60 channels. In other words, the user must repeatedly select the desired channels, using the ten keys, and set the channel skip flag data SFLG to "1", using the add key, for each of the remaining channels beyond those preset at the factory. This operation might have to be done as many as forty-eight times.

This becomes a severe burden on the user, and there is a large possibility that the user will misoperate the ten keys, and so on.

OBJECTS AND SUMMARY OF THE INVENTION

Accordingly, it is an object of this invention to provide an improved television receiver.

It is another object of this invention to provide a television receiver having a channel skip function which can be used more conveniently.

According to one aspect of the present invention, there is provided a television receiver of the type having channel selecting means and comprising:

(a) memory means for storing skip data indicative of whether a channel is to be skipped or not;

(b) detecting means for detecting whether or not a television signal is received through each selected channel;

(c) an automatic add key; and (d) means for sequentially selecting channels to be skipped in accordance with the skip data of said memory means when said automatic add key is operated and for changing said skip data to inhibit the skipping of a selected channel when a detected output of said detecting means indicates that a television signal is received through the selected channel.

These and other objects, features and advantages of the present invention will become apparent from the following detailed description of the preferred embodiment that is to be read in conjunction with the accompanying drawings.

DESCRIPTION OF THE PREFERRED EMBODIMENT

Now, an embodiment of a television receiver according to the present invention will hereinafter be described with reference to the attached drawings.

Figure 2:
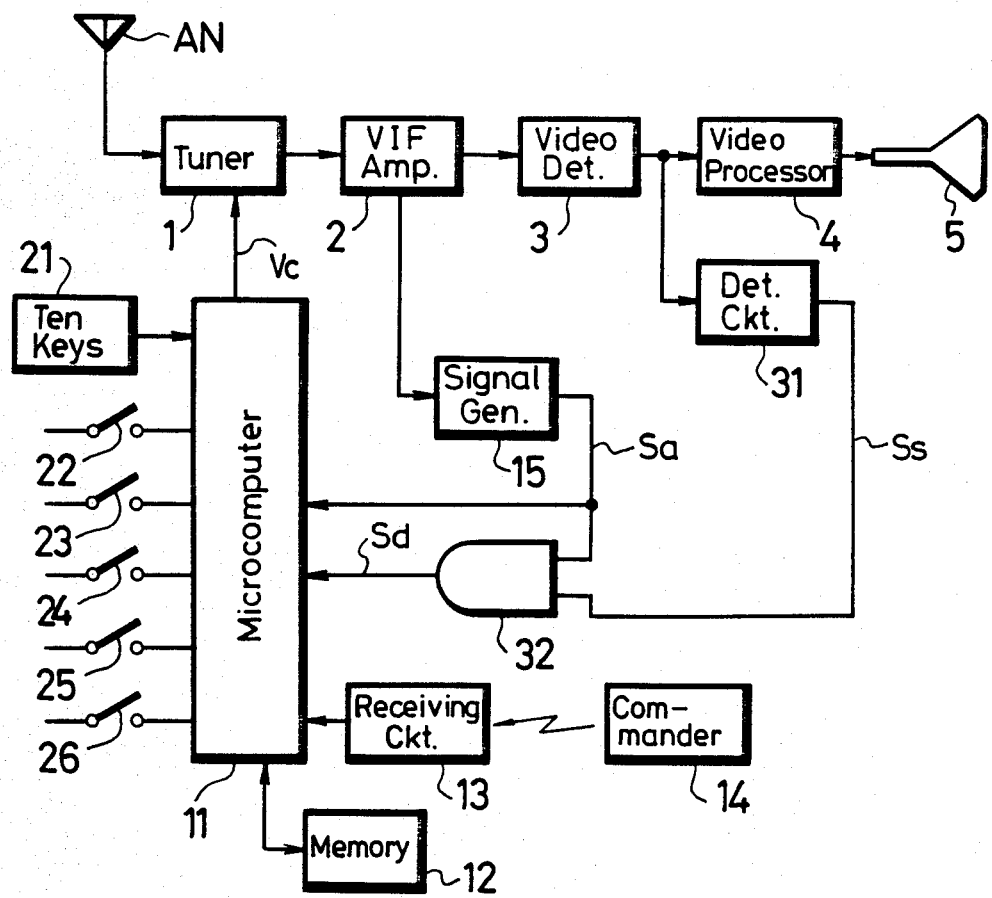
FIG. 2 is a system block diagram showing an embodiment of a television receiver according to the present invention.

FIG. 2 illustrates an overall circuit arrangement of a television receiver according to the invention.

Referring to FIG. 2, there is provided an antenna AN which receives a broadcasting signal. The broadcasting signal from the antenna AN is supplied to an electronic tuner 1. It is to be understood that the signal from the antenna AN also includes a CATV signal, or the like. The electronic tuner 1 is adapted to select a broadcasting signal of a desired channel and to convert it to a video intermediate frequency (VIF) signal on the basis of a channel selecting voltage Vc supplied thereto. The video intermediate frequency signal from the tuner 1 is supplied through a video intermediate frequency amplifier 2 to a video detecting circuit 3 which generates a color composite signal. The color composite signal from the video detecting circuit 3 is supplied to a video processing circuit 4 in which it is converted to three primary color signals. The three primary color signals are supplied to a color cathode ray tube (CRT) 5.

Figures 1, 3:
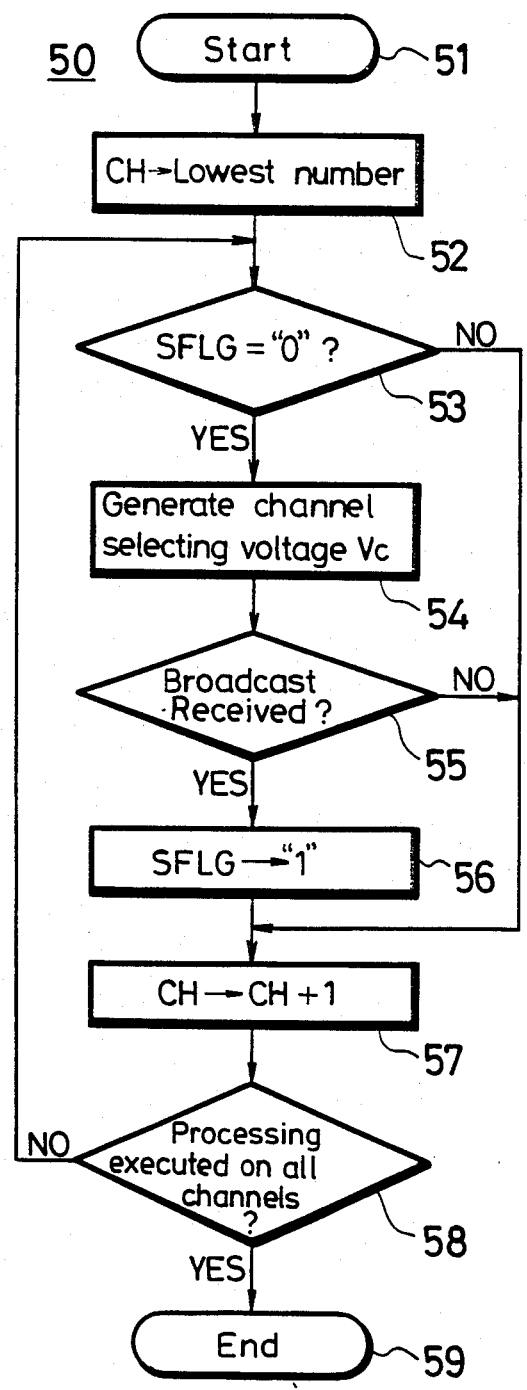
FIG. 1 is a diagram showing a flag table used to explain the present invention.
FIG. 3 is a flow chart to which reference will be made in explaining the operation of the television receiver of the invention.

A microcomputer 11 is provided for selecting a television channel. The microcomputer 11 is connected with a skip memory 12 which stores the skip flag data SFLG (FIG. 1). In this case, the skip memory 12 can be formed of a non-volatile memory or a C-MOS (complementary metal oxide semiconductor) memory backed up by a battery or the like so as to protect the skip flag data SFLG from being erased when the power of the television receiver is turned off.

Connected to the microcomputer 11 are ten keys 21 for channel selection, an up-key 22, a down-key 23, an add key 24, an erase key 25 and the like. At the same time, the microcomputer 11 is connected with a receiving circuit 13 for receiving a remote control signal. For example, the receiving circuit 13 may be a light receiving circuit of infrared rays to receive an infrared ray remote control signal from a commander (transmitter) 14. The commander 14 is provided with ten keys for channel selection, an up-key, a down-key and the like though not shown.

When the reception channel is designated by the ten keys 21, the up-key 22 and the down-key 23 or the commander 14, then the microcomputer 11 is operated to generate a channel selecting voltage Vc of a level corresponding to the channel designated. The channel selecting voltage Vc is supplied to the tuner 1, whereby the broadcasting signal of the designated channel is received.

At that time, the video intermediate frequency signal is generated from the intermediate frequency amplifier 2. The video intermediate frequency signal is then supplied to a signal forming circuit 15 which generates an AFT (automatic frequency tuning) signal Sa of, for example, two bits. This AFT signal Sa becomes "11" when the tuning frequency lies in a correct range; "10" when the tuning frequency shifts to a range higher than the correct frequency; and "01" when the tuning frequency lies in a range lower than the correct frequency. The signal Sa from the signal forming circuit 15 is supplied to the microcomputer 11 in which the channel selecting voltage Vc is finely adjusted by the signal Sa. Then, the automatic frequency tuning is carried out.

The video signal from the detecting circuit 3 is supplied to a detecting circuit 31 in which it is checked whether or not synchronizing pulses are obtained. Then, the detecting circuit 31 generates a detecting signal Ss which becomes "1" (high level) when the synchronizing pulses are detected and which becomes "0" (low level) when synchronizing pulses are not detected. This signal Ss is supplied to an AND circuit 32 and the signal Sa from the signal forming circuit 15 is also supplied to the AND circuit 32, with the result that the AND circuit 32 allows its output Sd to be supplied to the microcomputer 11. In this case, if the broadcasting signal is received, Sa="11" and Ss="1" are satisfied, thus Sd="1" being satisfied. If not, Sa≠"11" and Ss="0" are satisfied, thus Sd="0" being satisfied. Accordingly, the signal Sd indicates whether or not the television receiver receives the broadcasting signal.

The microcomputer 11 is further connected with an automatic add key 26, and an additional routine 50 as, for example, shown in FIG. 3 is written in the microcomputer 11 in its ROM (read only memory) not shown. The routine 50 is executed when the automatic add key 26 is operated.

When the add key 26 is pressed, the microcomputer 11 allows its CPU (central processing unit) to start its processing at step 51 of the routine 50. Then, data CH indicative of a channel of the lowest number (channel 2 in the U.S.A) is generated at step 52. At the next step 53, the skip flag data SFLG stored in the skip memory 12 is checked to see the condition of the flag of the channel indicated by data CH. If the flag data SFLG is "0" (skip mode), the processing goes from step 53 to step 54. At step 54, the corresponding channel selecting voltage Vc is formed in accordance with data CH and then supplied to the tuner 1. Accordingly, the tuner 1 is tuned to select the channel indicated by the data CH.

At the next step 55, it is checked by the output Sd from the AND circuit 32 whether or not a television signal is being received for that channel. If Sd="1", or a television signal is being received, the processing goes from step 55 to step 56. At step 56, the channel skip flag data SFLG stored in the memory 12 is set to "1" (stop mode). At the next step 57, the data CH indicating the channel is updated to data CH+1. Then, it is checked at the next step 58 whether or not the processing for the channel skip flag data SFLG is carried out for all the channels. If not, the processing goes back from step 58 to step 53. Consequently, the processes from steps 53 to 56 are executed for all the channels.

If it is determined at step 53 that the skip flag data SFLG of a certain channel is "1" (stop mode), the processing goes from step 53 to step 57. Further, if it is determined at step 55 that Sd="0" is satisfied, or that a television signal is not being received, the processing goes from step 55 to step 57.

If the above mentioned processes are executed for all the channels, the processing goes from step 58 to step 59 and the routine 50 is ended with step 59.

Accordingly, the skip flag data SFLG of all the channels are checked, whereby the skip flag data SFLG of selected channels and those on which no television signal is received have their skip flag data SFLG reset to the skip mode (SFLG="0") and those channels through which a television signal is received are set to "1".

As described above, according to the present invention, when the automatic add key 26 is pressed, the skip flag data SFLG of the channel through which a television signal is received is automatically set to "1" in the routine 50. As a result, when the channel selection is performed by the up-key 22, the down-key 23 or the similar keys of the remote control commander 14, the channel through which the television signal is received is easily selected without mistake.

Accordingly, the user does not have to repeatedly carry out a troublesome operation to select the broadcasting channel using the ten keys 21 and then to press the key 24. As a result, only the channels through which a television signal is actually received are presented for easy selection by the user. Further, the skip flag data SFLG can be set without misoperation.

In addition, since the flags SFLG of channels which have no broadcasting signal are not reset to "0" during the operation of the automatic add key, there is no danger that the flags SFLG "1" of channels which have broadcasting signals will be reset to "0" when the automatic add key is operated at midnight, when almost no broadcasting signals are available.

The above description is given on a single preferred embodiment of the invention but it will be apparent that many modifications and variations could be effected by one skilled in the art without departing from the spirit or scope of the novel concepts of the the erase key 25 is pressed to cause the microcomputer 11 to rest all of the skip flags to "0" invention, so that the scope of the invention should be determined by the appended claims only.

We claim as our invention:
1. A televison receiver of the type having channel selecting means and comprising:
   (a) memory means for storing skip data indicative of whether a channel is to be skipped or not;
   (b) detecting means, coupled to said channel selecting means, for detecting whether or not a television signal is received through each selected channel;
   (c) an automatic add key; and
   (d) means for sequentially selecting only channels to be skipped in accordance with the skip data of said memory means when said automatic add key is operated and for changing said skip data to inhibit the skipping of a selected channel when a detected output of said detecting means indicates that a television signal is received through the selected channel.

2. A television receiver according to claim 1, wherein said detecting means detects an AFT (automatic frequency tuning) signal.

3. A television receiver according to claim 1, wherein said detecting means detects a synchronizing signal.

4. A television receiver according to claim 1, wherein said detecting means detects an AFT signal and a synchronizing signal.

5. A television receiver according to claim 1, wherein said sequential channel selection begins with a channel of the lowest number.

6. A television receiver of the type having channel selecting means and comprising:
  (a) a memory in which skip data indicative of whether a channel is to be skipped or not is stored for every channel upon selecting a channel by means of the channel selecting means;
  (b) an automatic add key;
  (c) detecting means, coupled to said channel selecting means and said automatic add key, for detecting whether or not a television signl is received through each selected channel; and
  (d) means for sequentially selecting only a channel to be skipped in accordance with the skip data of said memory when said automatic add key is operated and for varying said skip data to such a value as to inhibit the skipping of the channel when a detected output of said detecting means indicates that a television signal is received through said selected channel.

* * * * *